US012773971B2

(12) United States Patent
Takimoto et al.

(10) Patent No.: US 12,773,971 B2
(45) Date of Patent: Oct. 27, 2026

(54) CONTROL DEVICE FOR ELECTRIC BRAKE, CONTROL METHOD FOR ELECTRIC BRAKE, AND MOTOR CONTROL DEVICE

(71) Applicant: Hitachi Astemo, Ltd., Hitachinaka (JP)

(72) Inventors: Koki Takimoto, Hitachinaka (JP); Daisuke Goto, Hitachinaka (JP); Takuya Usui, Hitachinaka (JP)

(73) Assignee: HITACHI ASTEMO, LTD., Ibaraki (JP)

(*) Notice: Subject to any disclaimer, the term of this patent is extended or adjusted under 35 U.S.C. 154(b) by 398 days.

(21) Appl. No.: 18/567,988

(22) PCT Filed: Jun. 2, 2022

(86) PCT No.: PCT/JP2022/022504

§ 371 (c)(1),
(2) Date: Dec. 7, 2023

(87) PCT Pub. No.: WO2022/259956

PCT Pub. Date: Dec. 15, 2022

(65) Prior Publication Data

US 2024/0262331 A1 Aug. 8, 2024

(30) Foreign Application Priority Data

Jun. 8, 2021 (JP) ................................ 2021-095801

(51) Int. Cl.
*B60T 8/17* (2006.01)
*B60T 13/74* (2006.01)
(Continued)

(52) U.S. Cl.
CPC ............... *B60T 8/17* (2013.01); *B60T 13/741* (2013.01); *F16D 2121/24* (2013.01);
(Continued)

(58) Field of Classification Search
CPC ........ F16D 2121/24; B60T 8/17; B60T 8/171; B60T 8/172; B60T 8/173; B60T 8/174;
(Continued)

(56) References Cited

U.S. PATENT DOCUMENTS 8,264,190 B2 * 9/2012 Suzuki .................. H02P 29/032 318/434
9,257,930 B2 * 2/2016 Suzuki ................ H02P 21/0003
(Continued)

FOREIGN PATENT DOCUMENTS

JP 2010-83282 4/2010

OTHER PUBLICATIONS

International Search Report issued Aug. 2, 2022 in International Application No. PCT/JP2022/022504, with English Translation.
(Continued)

*Primary Examiner* — James J Taylor, II
(74) *Attorney, Agent, or Firm* — Wenderoth, Lind & Ponack, L.L.P.

(57) ABSTRACT

A motor control device includes a first control unit and/or a second control unit serving as a control unit. The control unit outputs, to a first motor drive unit, a first current command for energizing a first winding set so that a first torque, which is a torque greater than a torque generated in a brake motor by a torque command for generating a requested torque requested of the brake motor, and which is in the same direction as a direction of the requested torque, is generated. The control unit also outputs, to a second motor drive unit, a second current command for energizing a second winding set so that a second torque, which is a torque based on a difference between the requested torque and the first torque, and which is in a direction reverse to the direction of the first torque, is generated.

11 Claims, 4 Drawing Sheets

(51) Int. Cl.
*F16D 121/24* (2012.01)
*H02P 25/22* (2006.01)
*H02P 29/024* (2016.01)
*H02P 29/028* (2016.01)

(52) U.S. Cl.
CPC ............ *H02P 25/22* (2013.01); *H02P 29/027* (2013.01); *H02P 29/028* (2013.01)

(58) Field of Classification Search
CPC ........ B60T 13/22; B60T 13/74; B60T 13/741; H02P 25/22; H02P 21/22; H02P 29/02; H02P 29/024; H02P 29/026; H02P 29/027; H02P 29/028; H02P 29/032; H02P 29/40
See application file for complete search history.

(56) References Cited

U.S. PATENT DOCUMENTS

| | | | | |
|---|---|---|---|---|
| 10,886,865 | B2 * | 1/2021 | Arai | H02P 21/22 |
| 11,565,671 | B2 * | 1/2023 | Cimpoesu | B60T 8/4022 |
| 2023/0105090 | A1 * | 4/2023 | Nomura | F16D 65/183 188/72.3 |

OTHER PUBLICATIONS

Written Opinion of the International Search Authority issued Aug. 2, 2022 in International Application No. PCT/JP2022/022504, with English Translation.

* cited by examiner

CONTROL DEVICE FOR ELECTRIC BRAKE, CONTROL METHOD FOR ELECTRIC BRAKE, AND MOTOR CONTROL DEVICE

TECHNICAL FIELD

The present disclosure relates to a control device for an electric brake, a control method for an electric brake, and a motor control device.

BACKGROUND ART

In Patent Literature 1, there is disclosed a technology about an electric disc brake in which a contact position of a pad (a position of contact between a brake pad and a disc rotor) is detected. The technology of Patent Literature 1 obtains a corrected current, which is a current with a current ripple removed, by storing a position-current characteristic of 1 revolution of a motor that is measured in force-reduction-direction operation in a clearance region, and subtracting the stored current value from a current value that is measured in force-increasing-direction operation. The technology of Patent Literature 1 then determines whether a position change amount (dI/dX) of the corrected current has exceeded a threshold value, to thereby detect the contact position of the pad. According to this technology, the contact position of the pad is detectable even without a thrust sensor.

CITATION LIST

Patent Literature

PTL 1: JP 2010-83282 A

SUMMARY OF INVENTION

Technical Problem

There is a technology for generating torque of a motor by energizing coils of two systems for one rotor. In this case, the motor is controlled by connecting the coils of two systems to inverters of separate systems, and detecting currents thereof with current sensors of separate systems as well. When the contact position of the pad is to be detected in an electric disc brake using this technology, a possible way to detect the contact position of the pad is, for example, to detect the contact position of the pad from the position change amount as described in Patent Literature 1 in one of the systems. However, the position change amount (a slope) is small because the position change amount is of only one of the systems, which may cause a low detection accuracy.

Solution to Problem

It is an object of the present invention to provide a control device for an electric brake, a control method for an electric brake, and a motor control device that are capable of suppressing a drop in position detection accuracy despite a configuration in which torque is generated by energizing coils of two systems for one rotor.

According to one embodiment of the present invention, there is provided a control device for an electric brake, the electric brake including: an electric mechanism configured to press a braking member against a braked member; and an electric motor configured to drive the electric mechanism, the electric motor including coils of two systems, the control device including: a first motor drive unit connected to a first-system coil of the electric motor; a second motor drive unit connected to a second-system coil of the electric motor; and a control unit configured to control the first motor drive unit and the second motor drive unit, the control unit being further configured to: output, to the first motor drive unit, a first current command for energizing the first-system coil so that first torque, which is torque greater than torque generated in the electric motor by a torque command for generating requested torque requested of the electric motor, and which is in the same direction as a direction of the requested torque, is generated; and output, to the second motor drive unit, a second current command for energizing the second-system coil so that second torque, which is torque based on a difference between the requested torque and the first torque, and which is in a direction reverse to the direction of the first torque, is generated.

Further, according to one embodiment of the present invention, there is provided a control method for an electric brake, the electric brake including: an electric mechanism configured to press a braking member against a braked member; and an electric motor configured to drive the electric mechanism, the electric motor including coils of two systems, the control method including: outputting, by a control unit configured to control a first motor drive unit connected to a first-system coil of the electric motor and a second motor drive unit connected to a second-system coil of the electric motor, to the first motor drive unit, a first current command for energizing the first-system coil so that first torque, which is torque greater than torque generated in the electric motor by a torque command for generating requested torque requested of the electric motor, and which is in the same direction as a direction of the requested torque, is generated; and outputting, by the control unit, to the second motor drive unit, a second current command for energizing the second-system coil so that second torque, which is torque based on a difference between the requested torque and the first torque, and which is in a direction reverse to the direction of the first torque, is generated.

In addition, according to one embodiment of the present invention, there is provided a motor control device including: a first motor drive unit connected to a first-system coil of an electric motor including coils of two systems; a second motor drive unit connected to a second-system coil of the electric motor; and a control unit configured to control the first motor drive unit and the second motor drive unit, the control unit being further configured to: output, to the first motor drive unit, a first current command for energizing the first-system coil so that first torque, which is torque greater than torque generated in the electric motor by a torque command for generating requested torque requested of the electric motor, and which is in the same direction as a direction of the requested torque, is generated; and output, to the second motor drive unit, a second current command for energizing the second-system coil so that second torque, which is torque based on a difference between the requested torque and the first torque, and which is in a direction reverse to the direction of the first torque, is generated.

According to the one embodiment of the present invention, the drop in position detection accuracy can be suppressed despite the configuration in which the torque is generated by energizing the coils of the two systems for one rotor.

DESCRIPTION OF EMBODIMENTS

There is now described with reference to the accompanying drawings an example of a case in which a control device for an electric brake (motor control device) according to an embodiment of the present invention is mounted on a four-wheeled automobile. In the flowchart illustrated in FIG. 3, each step is indicated by using the notation "S" (for example, Step 1="S1").

Figure 1:
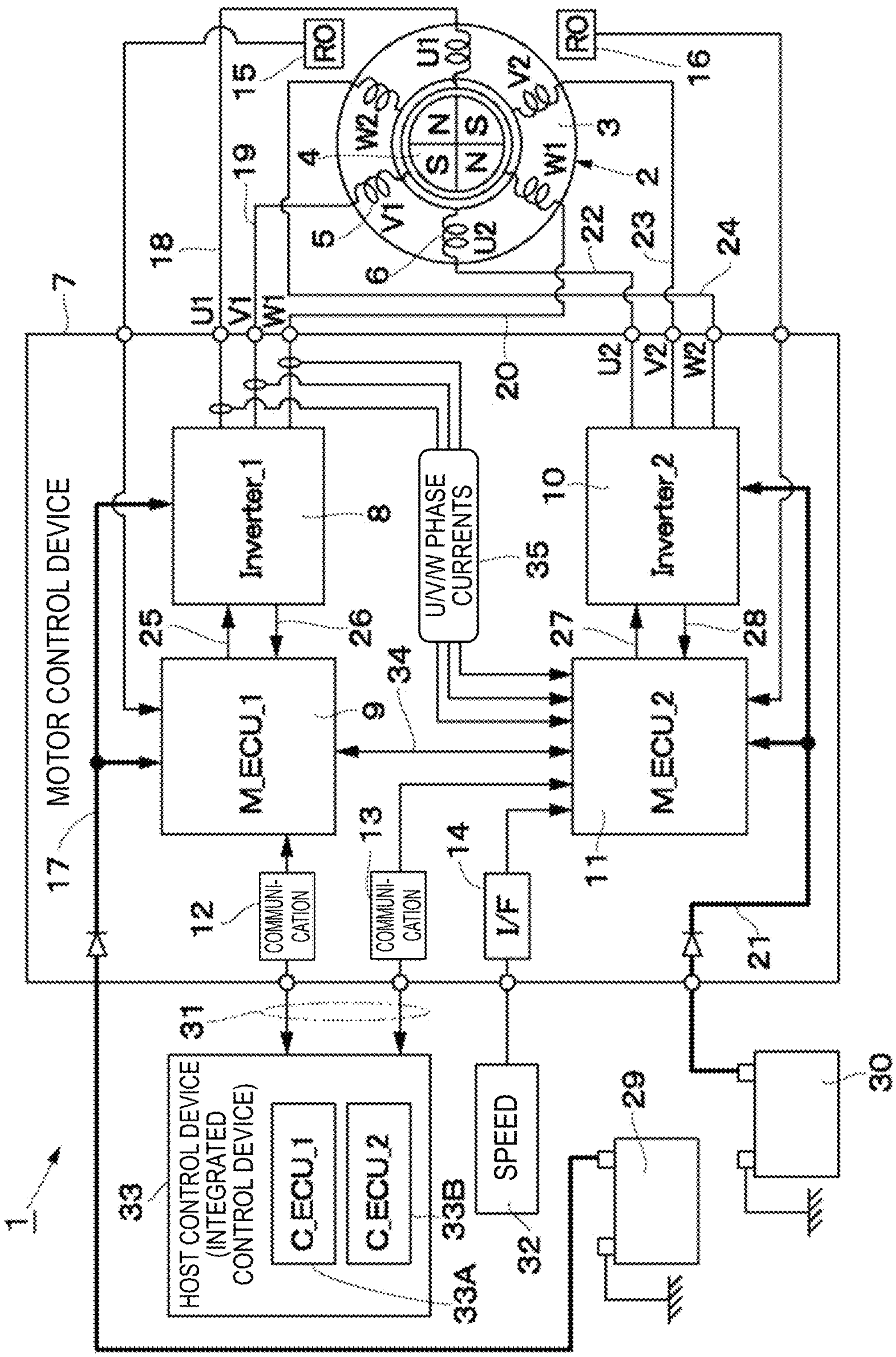
FIG. 1 is a block diagram for illustrating a motor control device (a control device for an electric brake) according to an embodiment of the present invention.

In FIG. 1, a motor control system 1 mounted on a vehicle (automobile) includes a brake motor 2 serving as an electric motor and a motor control device 7 serving as a motor controller. The motor control system 1 forms a brake system of the vehicle. The motor control system 1 may have a configuration including a host control device 33 serving as a controller of the vehicle (a vehicle controller). In the embodiment, the host control device 33 corresponds to an integrated controller for determining motion control of the vehicle. The host control device 33 is hereinafter referred to as "integrated control device 33."

The brake motor 2 drives an electric brake mechanism (not shown) for applying a braking force to the vehicle. The electric brake mechanism corresponds to, for example, an electric disc brake including an electric caliper which is driven by an electric motor to press a brake pad against a disc rotor. The electric brake mechanism (more specifically, the electric caliper) corresponds to an electric mechanism for pressing the brake pad, which is a braking member, against the disc rotor, which is a braked member. The brake motor 2 and the electric brake mechanism (electric caliper) form an electric brake. The motor control device 7 corresponds to a control device for an electric brake.

The brake motor 2 includes a stator 3 and a rotor 4, which is a permanent magnet rotor provided in a central portion of the stator 3 in a rotatable manner. The rotor 4 of the brake motor 2 is connected to, for example, a rotation shaft of a rotary-to-linear motion conversion mechanism (not shown). Rotation of the brake motor 2 (the rotor 4) is converted into a linear motion by the rotary-to-linear motion conversion mechanism, and the linear motion causes the brake pad of the electric brake mechanism to move close to or away from the disc rotor.

The brake motor 2 includes two winding sets 5 and 6 in order to secure redundancy. That is, the brake motor 2 is configured as a three-phase synchronous motor including a first winding set 5, which includes three-phase windings U1, V1, and W1 connected by star connection, and a second winding set 6, which similarly includes three-phase windings U2, V2, and W2 connected by star connection, in other words, a six-phase motor with three-phase double windings (a six-phase motor using three-phase coils of two systems for one rotor 4 to generate torque). The first winding set 5 and the second winding set 6 are provided in the stator 3 in a manner that insulates the winding sets 5 and 6 from each other.

The electric brake mechanism (electric brake) is not limited to an electric disc brake (electric caliper) and may be, for example, an electric drum brake including an electric cylinder which applies a braking force by pressing a shoe against a drum by an electric motor. A hydraulic disc brake including an electric motor (a hydraulic disc brake with an electric parking brake function), or a cable puller-type electric parking brake which causes a parking brake to perform applying operation by pulling a cable by an electric motor, may also be used as the electric brake mechanism (electric brake).

That is, various types of electric brakes (electric brake mechanisms) are usable as long as the electric brake (electric brake mechanism) has a configuration capable of applying and releasing a braking force (keeping and releasing a pressing force) by pressing (propelling) a friction member (a pad, a shoe) against a rotating member (a rotor, a drum) based on the drive of an electric motor (electric actuator). The electric brake mechanism (electric brake) may also be, for example, an electric boost device for braking by pressurizing cylinder devices (for example, brake calipers and pistons) each placed in one of the four wheels of the vehicle through control of a pressure of a brake fluid.

The motor control device 7 serving as a motor controller controls the brake motor 2. More specifically, the motor control device 7 drives and controls the windings U1, V1, and W1 of the first winding set 5, as well as the windings U2, V2, and W2 of the second winding set 6, of the brake motor 2. The motor control device 7 accordingly includes a first drive control system (a first motor drive unit 8 and a first control unit 9) for driving and controlling the first winding set 5 (U1, V1, and W1) and a second drive control system (a second motor drive unit 10 and a second control unit 11) for driving and controlling the second winding set 6 (U2, V2, and W2).

That is, the motor control device 7 includes the first motor drive unit 8, the first control unit 9, the second motor drive unit 10, and the second control unit 11. The motor control device 7 also includes a first communication interface 12, a second communication interface 13, and an interface (I/F) 14. The motor control device 7 thus includes three-phase coils (the first winding set 5 and the second winding set 6), inverters (the first motor drive unit 8 and the second motor drive unit 10), and CPUs (the first control unit 9 and the second control unit 11) of two systems so that one brake motor 2 can be driven by two systems.

The first motor drive unit 8 drives the brake motor 2. The first motor drive unit 8 is built from, for example, an inverter circuit. The first motor drive unit 8 is connected, via a first direct current power line 17, to a first power source 29 of the vehicle which is a power storage device (battery) or the like. The first motor drive unit 8 is connected to the windings U1, V1, and W1 of the first winding set 5 of the brake motor 2 as well via a U1-phase motive power line 18, a V1-phase motive power line 19, and a W1-phase motive power line 20, respectively. The first motor drive unit 8 is also connected to the first control unit 9 via signal lines 25 and 26.

The first motor drive unit 8 (the inverter circuit) includes a plurality of switching elements, which include, for example, a transistor, a field effect transistor (FET), and an insulated gate bipolar transistor (IGBT). Opening and closing of the switching elements of the first motor drive unit 8 (the inverter circuit) are controlled based on a command signal (for example, a pulse signal) from the first control unit 9. In driving the brake motor 2, the first motor drive unit 8 (the inverter circuit) generates alternating current powers of three phases (a U phase, a V phase, and a W phase) from a direct current power based on the command signal from the first control unit 9, and supplies the alternating current powers to the first winding set 5 (the windings U1, V1, and W1) of the brake motor 2.

The first control unit 9 is connected to the first motor drive unit 8. The first control unit 9 is also referred to as "electronic control unit (ECU)," and includes a microcomputer serving as an arithmetic circuit (a CPU). The first control unit 9 corresponds to a first motor ECU (M_ECU_1) and includes, for example, a power circuit (power management IC), the microcomputer, and a driver circuit (pre-driver). The first control unit 9 is connected to the first power source 29 of the vehicle via the first direct current power line 17, and is connected to the first motor drive unit 8 via the signal lines 25 and 26. The first control unit 9 controls (through switching control) the first motor drive unit 8 (inverter circuit), to thereby drive (forward rotation and reverse rotation) the brake motor 2.

The first control unit 9 is connected to a rotation sensor 15 for feedback control of rotation of the rotor 4 of the brake motor 2. The rotation sensor 15 detects, for example, a rotation angle (a rotational position and a motor angle) of the rotor 4 of the brake motor 2. The first control unit 9 is connected, via the first communication interface 12, to a vehicle data bus 31 serving as a communication line. The vehicle data bus 31 forms, for example, a Controller Area Network (CAN) serving as a communication network that is mounted on the vehicle. A large number of electronic devices mounted on the vehicle, for example, various types of ECUs including the integrated control device 33, a suspension control device (not shown), and a steering control device (not shown), perform multiplex communication to and from each other in the vehicle via the vehicle data bus 31.

The second motor drive unit 10 also drives the brake motor 2, similarly to the first motor drive unit 8. The second motor drive unit 10 is also built from, for example, an inverter circuit, similarly to the first motor drive unit 8. The second motor drive unit 10 is connected, via a second direct current power line 21, to a second power source 30 of the vehicle which is a power storage device (battery) or the like. The second motor drive unit 10 is connected to the windings U2, V2, and W2 of the second winding set 6 of the brake motor 2 as well via a U2-phase motive power line 22, a V2-phase motive power line 23, and a W2-phase motive power line 24, respectively. The second power source 30 is a power source separate (a power source of a separate system) from the first power source 29 connected to the first motor drive unit 8 and first control unit 9. Redundancy is secured by thus providing duplex systems of power supply paths.

The second motor drive unit 10 is also connected to the second control unit 11 via signal lines 27 and 28. The second motor drive unit 10 (the inverter circuit) also includes a plurality of switching elements, which include, for example, a transistor, a field effect transistor (FET), and an insulated gate bipolar transistor (IGBT). Opening and closing of the switching elements of the second motor drive unit 10 (the inverter circuit) are controlled based on a command signal (for example, a pulse signal) from the second control unit 11. In driving the brake motor 2, the second motor drive unit 10 (the inverter circuit) generates alternating current powers of three phases (a U phase, a V phase, and a W phase) from a direct current power based on the command signal from the second control unit 11, and supplies the alternating current powers to the second winding set 6 (the windings U2, V2, and W2) of the brake motor 2.

The second control unit 11 is connected to the second motor drive unit 10. The second control unit 11 is also referred to as "electronic control unit (ECU)," and includes a microcomputer serving as an arithmetic circuit (a CPU). The second control unit 11 corresponds to a second motor ECU (M_ECU_2) and includes, for example, a power circuit (power management IC), the microcomputer, and a driver circuit (pre-driver). The second control unit 11 is connected to the second power source 30 of the vehicle via the second direct current power line 21, and is connected to the second motor drive unit 10 via the signal lines 27 and 28. The second control unit 11 controls (through switching control) the second motor drive unit 10 (inverter circuit), to thereby drive (forward rotation and reverse rotation) the brake motor 2.

The second control unit 11 is connected to a rotation sensor 16 for feedback control of rotation of the rotor 4 of the brake motor 2. The rotation sensor 16 detects, for example, a rotation angle (a rotational position and a motor angle) of the rotor 4 of the brake motor 2. The rotation sensor 16 is a rotation sensor separate from the rotation sensor 15 connected to the first motor drive unit 8. This secures redundancy. The second control unit 11 is connected to the vehicle data bus 31 via the second communication interface 13. The second control unit 11 is also connected, via the interface 14, to a speed sensor 32. The speed sensor 32 is, for example, a sensor for detecting a speed of the vehicle. For example, a wheel sensor for detecting a rotational speed of a wheel may be employed as the speed sensor 32.

The integrated control device 33 is connected to the first control unit 9 and the second control unit 11. That is, the integrated control device 33 is connected to the first control unit 9 and the second control unit 11 via, for example, the vehicle data bus 31 referred to as "CAN." The integrated control device 33 is, for example, an integrative control device (integrated ECU) that determines vehicle motion control for moving a vehicle with respect to a target trajectory obtained from an automatic driving control device (automatic driving ECU). The integrated control device 33 outputs required control commands (for example, control commands related to automatic driving) to actuator control devices (actuator ECUs), for example, a motor drive device (motor drive ECU), a brake control device (brake ECU), the steering control device (a steering ECU), and the suspension control device (a suspension ECU).

In the embodiment, the motor control device 7 doubles as, for example, the motor drive device (motor drive ECU) which drives the brake motor 2 and the brake control device (brake ECU) which executes integrated control regarding braking. That is, the motor control device 7 (brake motor control ECU) is unitarily configured as a control device that has both of a motor drive function and a brake control function. However, the motor control device 7 is not limited thereto and, for example, the motor drive device (motor drive ECU) and the brake control device (brake ECU) may be configured as separate devices.

The integrated control device 33 is also referred to as "central control device (central ECU)" and corresponds to a control device superordinate to the motor control device 7. The integrated control device 33, too, includes a microcomputer serving as an arithmetic circuit (a CPU). In this case, the integrated control device 33 is built from, for example, a dual core (double circuit) so that the same processing is executed in parallel with a difference between processing results of parallel processing being monitored for. That is, the integrated control device 33 is built from two control units 33A and 33B (a first central ECU (C_ECU_1) and a second central ECU (C_ECU_2)).

The first control unit 9 and the second control unit 11 are each connected to the integrated control device 33. The second control unit 11 is connected to the first control unit 9 via a communication line 34 (a CPU-to-CPU communication line). The second control unit 11 monitors a state of the first motor drive unit 8. More specifically, the second control unit 11 monitors states of phase currents in the first motor drive unit 8.

To that end, a phase current monitoring circuit 35 is connected to the U1-phase motive power line 18, the V1-phase motive power line 19, and the W1-phase motive power line 20 of the first motor drive unit 8. The phase current monitoring circuit 35 is connected to the second control unit 11, and the second control unit 11 monitors phase currents of the first motor drive unit 8 with use of the phase current monitoring circuit 35. The second control unit 11 determines that the first control unit 9 is in an abnormal state in such cases as when a monitor value monitored by the phase current monitoring circuit 35 is outside a normal range and control dictated by a control command is not being accomplished.

Incidentally, the electric disc brake of Patent Literature 1 described above detects the contact position of the pad (the position of contact between the brake pad and the disc rotor) based on whether the position change amount of the current has exceeded a threshold value. Application of this technology of Patent Literature 1 to an electric disc brake that generates torque of a motor by energizing coils of two systems for one rotor is considered.

In this case, when, for example, the contact position of the pad is detected from the position change amount in one of the systems as described in Patent Literature 1, a change amount (a slope) of the current relative to thrust may be too small to secure a satisfactory detection accuracy. There is also a possibility that the detection takes long. In the embodiment, the accuracy of the position detection, more specifically, the detection accuracy of the contact position of the brake pad (a contact member, a braking member) with respect to the disc rotor (a contacted member, a braked member) is raised in the configuration in which torque is generated by energizing coils of two systems for one rotor.

For that purpose, when highly accurate detection is to be executed in the operation of detecting the contact position of the brake pad (may simply be referred to as "pad"), the embodiment avoids generating torque required to implement operation evenly between the coils of both of the systems. That is, in the operation of detecting the contact position of the pad in the embodiment, one of the coils (for example, a first-system coil) is treated as a detection-side coil, and another of the coils (for example, a second-system coil) which is treated as a no-detection-side coil is energized so that torque is generated in a direction reverse to an operation direction.

This enables increase in a current amount of the detection-side coil that is required to implement the operation, and a current change amount in relation to a change in thrust that occurs when the brake pad is brought into contact with the disc rotor (that is, when thrust is generated) can accordingly be increased. As a result, a ratio of a current error to an energization amount can be kept low. That is, in the embodiment, the detection accuracy of the contact position of the pad can be improved because an estimated error of the thrust can be kept small.

Figure 2:
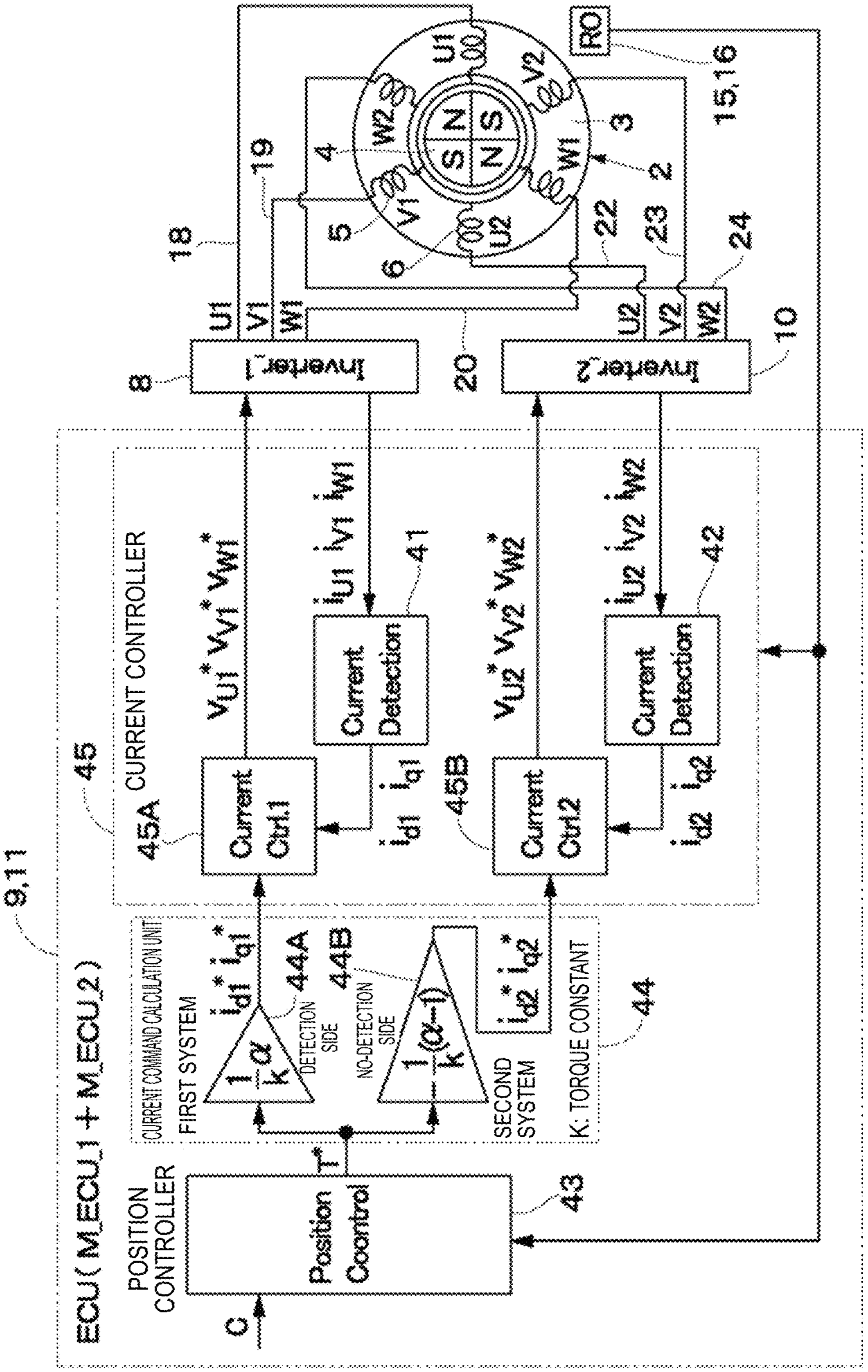
FIG. 2 is a block diagram for illustrating control processing for generating torque in an electric motor.

Those points are described below with reference to FIG. 2 to FIG. 4 in addition to FIG. 1. In FIG. 2, the two control units 9 and 11 are expressed as virtually one control unit in order to avoid making the drawing complex. In the embodiment, however, two control units 9 and 11 are included as illustrated in FIG. 1. The two control units 9 and 11 are also connected to each other via the communication line 34 (the CPU-to-CPU communication line). The following description accordingly takes as an example a case in which processing of detecting the contact position of the pad is executed by the first control unit 9 and the second control unit 11.

However, the present invention is not limited thereto, and processing to be executed by the first control unit 9 may be executed by the second control unit 11, and processing to be executed by the second control unit 11 may be executed by the first control unit 9. One of the control units (9 or 11) out of the first control unit 9 and the second control unit 11 may execute both of processing to be executed by the first control unit 9 and processing to be executed by the second control unit 11. That is, one or both of the first control unit 9 and the second control unit 11 correspond to a control unit that controls the first motor drive unit 8 and the second motor drive unit 10.

In the embodiment, the brake motor 2 includes coils (the first winding set 5 and the second winding set 6) of two systems for one rotor 4. Motor control for generating torque by energizing the coils (the first winding set 5 and the second winding set 6) of two systems is executed in the brake motor 2. The coils (the first winding set 5 and the second winding set 6) of two systems are respectively connected to inverters (the first motor drive unit 8 and the second motor drive unit 10) of separate systems, and currents thereof are detected with a current sensor 41 and a current sensor 42 (FIG. 2) of separate systems, to thereby execute the motor control.

In the embodiment, the power sources 29 and 30 have a redundant configuration so that motor control can be continued as long as possible in the event of a failure. That is, in the embodiment, the first motor drive unit 8 and the second motor drive unit 10 each built from an inverter are connected to the separate power sources 29 and 30, respectively. In an example of a possible configuration (not shown), a power supply circuit capable of cutting electrical connection to one of the power sources (29 or 30) that is experiencing a failure out of the power sources 29 and 30 is provided, and the motor drive units 8 and 10 are both connected to this power supply circuit.

The system for controlling the brake motor 2 (the brake system) may be configured so as to include one CPU (microprocessor) as control means. However, in order to continue control in the event of a failure of the CPU, a redundant CPU is desirably provided and, in this case, it is preferred that the CPUs have a configuration that enable the CPUs to share calculation results of each other through CPU-to-CPU communication or the like. The embodiment accordingly has a configuration in which two CPUs (microcomputers) are included, that is, two control units which are the first control unit 9 and the second control unit 11 are included, and the first control unit 9 and the second control unit 11 are connected to each other by the communication line 34 (a CPU-to-CPU communication line).

As illustrated in FIG. 2, the control units 9 and 11 including two CPUs control the first motor drive unit 8 and the second motor drive unit 10, which serve as inverters, to thereby energize the first winding set 5 and the second winding set 6, which are sets of three-phase coils independent of each other. As a result, a feedback loop for generating desired motor torque is built by detecting currents that flow into the first winding set 5 and the second winding set 6 with the current sensors 41 and 42 (FIG. 2), and also detecting the motor angles of the brake motor 2 with the rotation sensors 15 and 16, which serve as angle sensors (motor angle sensors).

In FIG. 2, the first current sensor 41 detects the current of the first winding set 5, and the second current sensor 42 detects the current of the second winding set 6. Three current sensors may be placed in each of the systems as the current sensor 41 or 42 so that the currents (the U-phase, the V-phase, and the W-phase) flowing in the first winding set 5 and the second winding set 6, which are each a set of three-phase coils, are directly detected. The current sensors 41 and 42 may each be two current sensors or one current sensor w % ben existing technologies are used to set appropriate locations to place the current sensors and appropriate current detection timing, that is, as long as the three-phase currents can be detected directly or estimated.

FIG. 2 is an illustration of an example of content of control (control processing) executed in the control units 9 and 11 in order to generate torque in the brake motor 2. The control units 9 and 11 include a position controller 43, a current command calculation unit 44 (a first current command calculation unit 44A and a second current command calculation unit 44B), and a current controller 45 (a first current controller 45A and a second current controller 45B). The position controller 43 calculates a torque command T* based on a deviation between a motor angle command C issued from host control and motor angles detected with the rotation sensors 15 and 16.

The position controller 43 outputs the calculated torque command T* to the current command calculation unit 44. In this case, the position controller 43 outputs the torque command T* to each of the first current command calculation unit 44A and the second current command calculation unit 44B of the current command calculation unit 44. In the embodiment, a command from host control is the motor angle command C. and the torque command T* is calculated based on the motor angle command C. However, the command from host control may be a speed command or a motor torque command, for example.

The torque command T* from the position controller 43 is input to the current command calculation unit 44. In the current command calculation unit 44, current commands id1*, iq1*, id2*, and iq2* are calculated so that the sum of the torque generated by the first winding set 5 serving as one coil and the torque generated by the second winding set 6 serving as another coil reaches desired torque (requested torque) to be output by the brake motor 2. The current command calculation unit 44 outputs the calculated current commands id1*, iq1*, id2*, and iq2* to the current controller 45 (the first current controller 45A and the second current controller 45B).

The current command calculation unit 44 includes the first current command calculation unit 44A and the second current command calculation unit 44B. The first current command calculation unit 44A calculates, for example, the current commands id1* and iq1* of one of the systems (for example, a first system) that is a side (a detection side) on which the contact position of the pad is detected. In this case, the first current command calculation unit 44A multiplies the torque command T* by "1/K×α," to thereby calculate the current commands id1* and iq1*. The symbol "K" represents a torque constant of the motor. The second current command calculation unit 44B calculates, for example, the current commands id2* and iq2* of another of the systems (for example, a second system) that is a side (a no-detection side) on which the contact position of the pad is not detected. In this case, the second current command calculation unit 44B multiplies the torque command T* by "−I/K×(α−1)," to thereby calculate the current commands id2* and iq2*. In the current command calculation unit 44, gains for converting torque (a torque command) into currents (current commands) are thus "1/K×α" on the detection side and "−1/K×(α−1)" on the no-detection side.

Description on "a" is given. For example, "a" is set to "0.5" in normal braking. In this case, the current commands id1* and iq1* or the current commands id2* and iq2* that command to output a half of the desired torque (requested torque) to be output in the brake motor 2 are calculated on each of the detection side and the no-detection side in the current command calculation unit 44. When the contact position of the pad is to be detected with high accuracy, on the other hand, "α" is set to "1" or more. In this case, the current command calculation unit 44 calculates the current commands id1* and iq1* that command to output the torque times a (first torque) on the detection side and calculates, on the no-detection side, the current commands id2* and iq2* that command to output reverse torque, that is, reverse-direction torque (second torque) which adds up to the desired torque when combined with the detection side torque.

The current commands id1* and iq1* calculated by the first current command calculation unit 44A and the current commands id2* and iq2* calculated by the second current command calculation unit 44B are output to the current controller 45. In this case, the current commands id1* and iq1* calculated by the first current command calculation unit 44A are output to the first current controller 45A and the current commands id2* and iq2* calculated by the second current command calculation unit 44B are output to the second current controller 45B. The current command calculation unit 44 thus distributes the current commands id1*, iq1*, id2*, and iq2* for outputting the desired torque (requested torque) in the brake motor 2 to the current controller 45.

The current controller 45 (the first current controller 45A and the second current controller 45B) controls, for example, a current for energizing the first winding set 5, which is a set of three-phase coils of the first system, and a current for energizing the second winding set 6, which is a set of three-phase coils of the second system. The current controller 45 (the first current controller 45A and the second current controller 45B) determines three-phase voltage values based on the three-phase currents detected or estimated by the current sensors 41 and 42, and on the motor angles (electrical angle phases) detected by the rotation sensors 15 and 16, to thereby control the first motor drive unit 8 and the second motor drive unit 10.

That is, the first current controller 45A which is the first system side (for example, the side of the first control unit 9) of the current controller 45 determines three-phase voltage values vU1*, vV1*, and vW1* based on three-phase currents iU1, iV1, and iW1 (or id1 and iq1) detected or estimated by the current sensor 41, and on the motor angle (electrical angle phase) detected by the rotation sensor 15, to thereby control the first motor drive unit 8. The second current controller 45B which is the second system side (for example, the side of the second control unit 11) of the current controller 45 determines three-phase voltage values vU2*, vV2*, and vW2* based on three-phase currents iU2, iV2, and iW2 (or id2 and iq2) detected or estimated by the current sensor 42, and on the motor angle (electrical angle phase) detected by the rotation sensor 16, to thereby control the second motor drive unit 10.

Processing for controlling a current is generally required to be executed at a high speed. Accordingly, when the control units 9 and 11 exist independently with respect to their respective motor drive units 8 and 10, processing for controlling a current is preferred to be implemented in each of the control units 9 and 11. That is, it is preferred to implement processing of controlling currents on the first system side in the first control unit 9 and implement processing of controlling currents on the second system side in the second control unit 11.

Alternatively, for example, processing of calculating current commands or motor torque commands to be implemented in the respective systems based on the motor angle command may be executed by one of the CPUs (the first control unit 9 or the second control unit 11) alone, and results of calculating the commands may be transmitted to another of the CPUs (the second control unit 11 or the first control unit 9) with the use of the CPU-to-CPU communication (the communication line 34).

Also, each of the CPUs (the control units 9 and 11) may execute the same calculation independently of each other and use only the torque command to be implemented in the system to which the CPU (the control unit 9 or 11) belongs. The CPUs (the control units 9 and 11) may transmit results of the calculations executed independently of each other with the use of the CPU-to-CPU communication (the communication line 34) to compare and select from the results.

In the embodiment, the control units 9 and 11 executes detection of the contact position of the pad. In the detection, the embodiment includes generating the first torque greater than the requested torque (the torque command T*) in the coils (the first winding set 5 or the second winding set 6) of the system on the side on which the contact position of the pad is detected (the detection side) so that highly accurate detection of the contact position of the pad is accomplished. On the other hand, the second torque which is in a direction reverse to the direction of the requested torque (the torque command T*) and which is based on a difference between the requested torque (the torque command T*) and the first torque is generated in the coils (the second winding set 6 or the first winding set 5) of the system on the side on which the contact position of the pad is not detected (the no-detection side).

Detection processing executed in the control units 9 and 11 to detect the contact position of the pad is described with reference to FIG. 3. Control processing of FIG. 3 is, for example, repeatedly executed at a predetermined control cycle (1 ms, for example).

Figure 3:
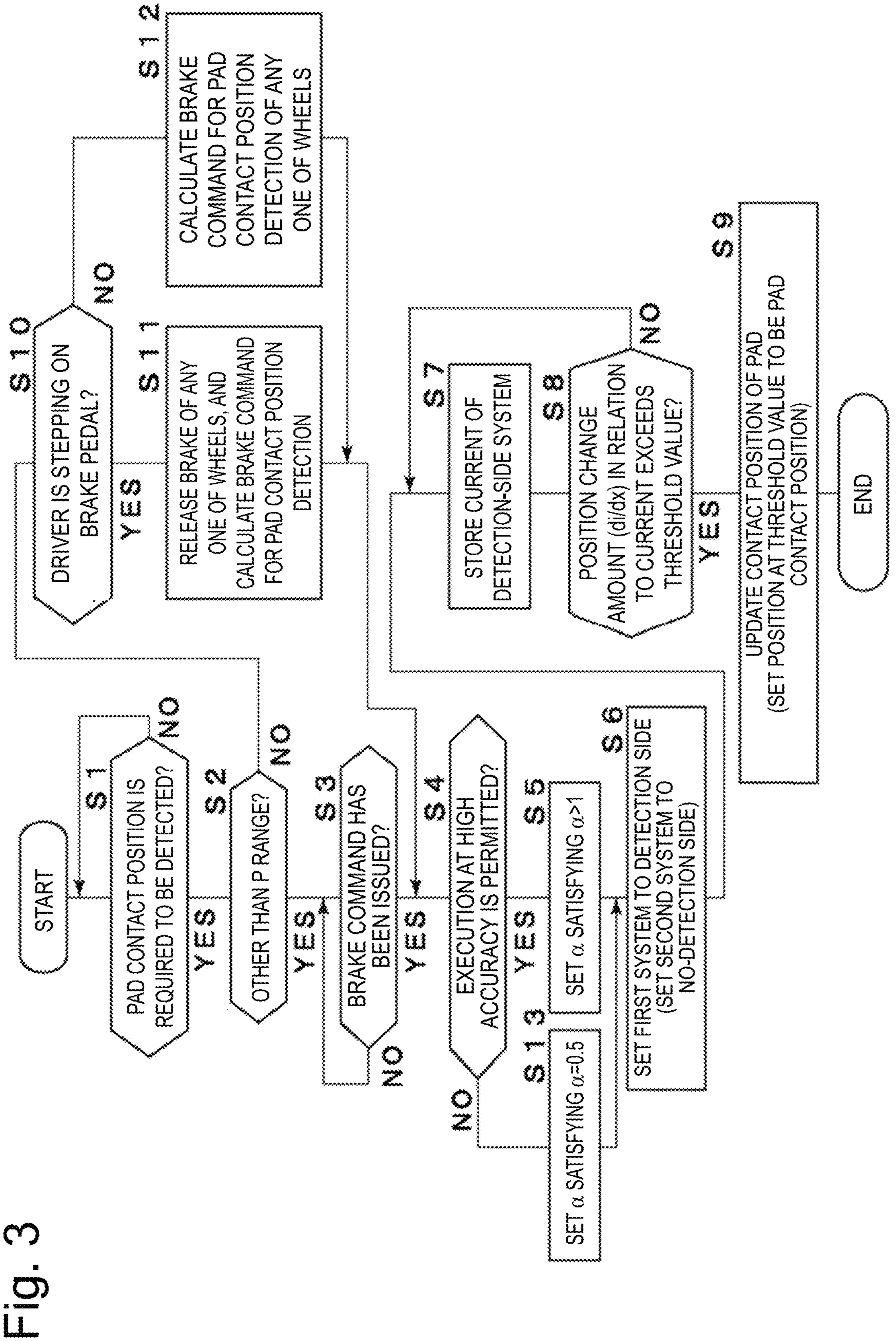
FIG. 3 is a flow chart for illustrating control processing for detecting a contact position of a brake pad (a contact member, a braking member).

When the control processing of FIG. 3 is started, whether the contact position of the pad is required to be detected is determined in Step S1. A desired time to execute the detection of the contact position of the pad is, for example, when the vehicle is active (for example, when a vehicle power source is turned on or an ignition is turned on), or when a certain length of time elapses during driving. Accordingly, whether the vehicle power source is turned on or whether the ignition is turned on, for example, is determined in Step S1. When determination in Step S1 is "YES," that is, when detection of the contact position of the pad is determined to be required, the process proceeds to Step S2. When the determination in Step S1 is "NO," that is, when detection of the contact position of the pad is determined to be unrequired, on the other hand, the processing step of Step S1 is repeated.

In Step S2, whether a shift lever (an AT range) is in a range other than a P range (shift lever position for parking) is determined. In the embodiment, detection of the contact position of the pad is executed during brake control such as braking, or during operation based on an operation command for detecting the contact position of the pad. Accordingly, whether a brake command for detecting the contact position is to be a "brake command output based on operation of a driver" or a "brake command output from the brake system irrespective of the driver's operation" is determined in Step S2. When determination in Step S2 is "YES," a brake command based on the driver's operation is to be output, and the process proceeds to Step S3.

When the determination in Step S2 is "NO," on the other hand, a brake command from the brake system is to be output, and the process proceeds to Step S10. The processing step of S2 can take any form as long as it can be determined that the vehicle is stopped and consequently gives no trouble even if braking action different from the driver's braking intention is executed. The processing step of Step S2 may accordingly be determination about, for example, whether a parking brake is engaged (the parking brake is in operation), or whether parking maintaining control is exerted (the parking maintaining control is in effect). That is, in Step S2, the time when the parking brake is engaged or the parking maintaining control is exerted may be determined to be the time when the shift lever is in the P range (equivalent to the P range).

A case in which the determination in Step S2 is "YES," that is, a case in which the shift lever is determined to be in a range other than the P range, is described first. When the determination in Step S2 is "YES." the process proceeds to Step S3. In Step S3, whether a brake command has been issued is determined. When determination in Step S3 is "NO," that is, when it is determined in Step S3 that no brake command has been issued, the processing step of Step S3 is repeated. When the determination in Step S3 is "YES," on the other hand, that is, when it is determined in Step S3 that a brake command has been issued, the process proceeds to Step S4. In this manner, issuance of a brake command is waited for in Step S3.

In Step S4, whether highly accurate detection of the contact position of the pad is permitted is determined. Whether highly accurate position detection (highly accurate detection of the contact position) is permitted depends on a state of the brake system and the brake command. A state in which highly accurate position detection is permitted is, for example, a case in which there is no restriction on a current due to a fail (a case in which a current usable by the brake system is not restricted), and a brake response dictated in the brake command is equal to or more than a limit value, in addition to favorable conditions regarding temperature and battery voltage.

That is, it is preferred to execute highly accurate position detection when the temperature of the brake pad, the voltage of the power source (the battery voltage), and the like are within ranges set in advance. The ranges set in advance can be set as a temperature range and a battery voltage range in which highly accurate position detection is executable. The highly accurate position detection is preferred to be executed when an acceptable value of the current is equal to or more than a value set in advance. The value set in advance can be set as a value at which a current large enough to execute highly accurate position detection is secured. A reason for placing this restriction with regards to the current is that, in highly accurate position detection, a current larger than in normal brake action is consumed due to application of the torque in the reverse direction from any of the coils (the first-system coil).

The highly accurate position detection is preferred to be executed also when the response dictated in the brake command is equal to or more than a limit value set in advance. The limit value set in advance can be set as a value at which the response is secured despite execution of the highly accurate position detection. A reason for placing this restriction with regards to the brake response is that, in highly accurate position detection, the brake pad is moved toward a braking side by one of the motor drive circuits (for example, the first motor drive unit 8).

That is, when highly accurate position detection is to be executed, another of the motor drive circuits (for example, the second motor drive unit 10) is used to generate torque in a direction reverse to the braking side. This causes the brake response in highly accurate position detection to be slow compared to a case in which the brake pad is moved toward the braking side by both of the motor drive circuits (for example, the first motor drive unit 8 and the second motor drive unit 10). For that reason, the restriction is placed on the brake response.

When determination in Step S4 is "YES," that is, when it is determined in Step S4 that highly accurate detection of the contact position of the pad is permitted, the process proceeds to Step S5. When the determination in Step S4 is "NO," that is, when it is determined in Step S4 that executing detection of the contact position of the pad at high accuracy is undesirable, on the other hand, the process proceeds to Step S13.

In Step S5, a value of a for executing detection of the contact position of the pad at high accuracy is set. That is, a value of a that satisfies $\alpha>1$ is set on the detection side in order to output torque that is "a times" greater than the torque command. This enables increase in a current amount of the detection-side coil, and a current change amount in relation to a change in thrust that occurs when the brake pad is brought into contact with the disc rotor (when thrust is generated) can accordingly be increased. As a result, a ratio of a current error to an energization amount can be kept low. That is, the detection accuracy of the contact position of the pad can be improved because the estimated error of the thrust can be kept small.

On the other hand, the no-detection side is energized so that torque that is "a-1" times greater than the torque command is generated in a direction reverse to the operation direction, and so that a sum value of the detection-side torque and the no-detection side torque equals the value of the command torque. The value of a can be set from a clearance required to reduce a drag torque that is generated by contact between the brake pad and the disc rotor during non-braking to a predetermined value (a clearance between the brake pad and the disc rotor), and from a detection error in pad contact position detection that is required to balance the clearance and an idle time allowed until a braking force is generated by closing the clearance when braking.

The drag torque is in inverse proportion to an amount of the clearance. A standby position is accordingly required to be "a clearance amount for setting the drag torque to the predetermined amount"+"the detection error in pad contact position detection" in order to ensure that the drag torque is equal to or less than the predetermined amount. Consequently, a piston travel amount required until the braking force is generated increases by the detection error in pad contact position detection, thus prolonging the idle time. A reduction of the error detection in pad contact position detection accordingly leads to shortening of the idle time.

On the other hand, detection of the pad contact position with use of a current utilizes the fact that, when thrust is generated by contact of the piston with the brake pad, the current increases in proportion to the thrust. Detection of a position at which the current or a change amount of the current exceeds a certain threshold value is synonymous with detection of a position at which the thrust or a change amount of the thrust exceeds a certain threshold value, but the current that is recognized contains an error. The error consequently causes an estimation error in thrust estimation, which becomes the detection error in pad contact position detection. As illustrated in FIG. 4 described later, when a satisfies $\alpha>1$, the change amount of the current relative to the change amount of the thrust increases from when a is 0.5, and a ratio of the current error to the thrust change amount becomes relatively small, with the result that the detection error in pad contact position detection can be made small as well.

The recognition error of the current can be estimated from sensor specifications, an AD conversion error of a microcomputer, and the like. A relationship between the current and the thrust, a relationship between the thrust and the position, a relationship between the drag torque and the clearance amount, and a relationship between the clearance amount and the idle time can be estimated from design values, experiments, and the like.

Accordingly, the value of a in Step S5, that is, the value of a by which the torque command is multiplied in order to set the detection-side torque (first torque) can be set based on a clearance that is set due to the drag torque under a state in which the electric brake is not applied, and on the detection error in contact position detection. After the value of a is set in Step S5, the process proceeds to Step S6.

In Step S6, the system of the drive circuit set to be the detection side is set. Although the first system is set here to be the detection side in Step S6, the detection-side system may be alternated after one brake action, one trip, a predetermined length of time, a predetermined number of times of braking, or the like. That is, in Step S6, the first motor drive unit 8 and the first winding set 5 are set to be the detection side, and the second motor drive unit 10 and the second winding set 6 are set to be the no-detection side. In Step S6, when a condition is established, that is, when the brake action, the trip, the time, the number of times of braking, or the like reaches a threshold value (a determination value for switching), the second motor drive unit 10 and the second winding set 6 are set to be the detection side, and the first motor drive unit 8 and the first winding set 5 are set to be the no-detection side.

The detection side and the no-detection side can thus be switched (alternated) based on the number of times of brake action, the trip, the time, the number of times of braking, or the like. When detection of the contact position of the pad is executed by alternating sides in this manner, each system is put into action an equal number of times, and loads on the two systems are accordingly equalized, with the result that durability is improved compared to a case in which the detection side is fixed to one of the systems. The contact position of the pad may also be detected in each of the two systems by executing the detection twice in total with the detection side and the no-detection side alternated.

After the detection side and the no-detection side are set in Step S6, the first current command calculation unit 44A on the detection side and the second current command calculation unit 44B on the no-detection side output the current commands id1*, iq1*, id2*, and iq2* based on the brake command. Specifically, when the brake command is the torque command T*, the first current command calculation unit 44A on the detection side outputs the current commands id1* and iq1* that are obtained by multiplying the torque command T* by "1/K×α." In this case, when a is set so as to satisfy "α>1" in the processing step of Step S5 of FIG. 3, the current commands id1* and iq1* for generating torque greater than the torque command T* in the same direction as the direction of the torque command T* are output from the first current command calculation unit 44A. The second current command calculation unit 44B on the no-detection side outputs the current commands id2* and iq2* that are obtained by multiplying the torque command T* by "−1/K×(α−1)." In this case, when a is set so as to satisfy "α>1" in the processing step of Step S5 of FIG. 3, the current commands id2* and iq2* for generating torque based on a difference between the torque command T* and the first torque in a direction reverse to the direction of the torque command T* are output from the second current command calculation unit 44B.

After the detection side and the no-detection side are set and the current commands id1*, iq1*, id2*, and iq2* based on the brake command are output in Step S6, the process proceeds to Step S7. In Step S7, a current value for the position of the detection-side system is recorded. In the subsequent Step S8, whether a change amount (di/dx) of the position in relation to the current has exceeded a threshold value is determined based on the current recorded in Step S7. When determination in Step S8 is "NO." that is, when it is determined in Step S8 that the change amount (di/dx) has not exceeded the threshold value, the process returns to Step S7. That is, the current is recorded again in Step S7, and the processing steps of Step S7 and Step S8 are repeated until the position change amount (di/dx) exceeds the threshold value. The threshold value can be obtained as, for example, a change amount (current change amount) at the time when the brake pad and the disc rotor come into contact with each other, by calculation, an experiment, simulation, or the like, in advance.

When the determination in Step S8 is "YES," that is, when it is determined in Step S8 that the change amount (di/dx) has exceeded the threshold value, on the other hand, the process proceeds to Step S9. In Step S9, the pad contact position is updated. That is, in Step S9, a position at which the threshold value has been exceeded is set as the contact position of the pad, and this contact position is used to update as the latest contact position. With the update of the pad contact position in Step S9, the detection of the pad contact position based on this brake command is completed. That is, the process reaches the end and then returns to the start to repeat Step S1 and the subsequent processing steps.

When the determination in Step S4 is "NO" and the process proceeds to Step S13, on the other hand, a is set in Step S13. In Step S13, a for a case in which highly accurate detection of the contact position of the pad is inexecutable is set. That is, a is set to 0.5 on the detection side, and a half of desired torque is output from the detection side and the no-detection side each. In this case, detection of the position of the pad can be executed by the same drive circuit operation and the same current as the drive circuit operation and the current that are used in normal braking. When a is 0.5, any one of the systems can be set to the detection side in Step S6.

A case in which the determination in Step S2 is "NO," that is, a case in which the shift lever is determined to be in the P range in Step S2, is described next. When the determination in Step S2 is "NO," the process proceeds to Step S10. In this case, because the shift lever is in the P range, whether the driver is stepping on a brake pedal is determined in Step S10. That is, in Step 10, whether a brake command has been output by the driver's pedal operation is determined. When determination in Step S10 is "YES." that is, w % ben it is determined in Step S10 that a brake command by the driver has been output, the process proceeds to Step S11. When the determination in Step S10 is "NO," that is, when it is determined in Step S10 that a brake command by the driver has not been output, the process proceeds to Step S12.

In the case in which a brake command by the driver has been output, the brake system is required to output a brake command after the brake of a wheel in which the contact position of the pad is to be detected is released once. In the case in which a brake command by the driver has not been output, on the other hand, the brake system simply outputs a brake command. That is, an action to be taken by the brake system varies depending on whether a brake command by the driver has been output. Accordingly, whether the driver is stepping on the brake pedal is determined in Step S10.

In which one of the four wheels of the vehicle the detection of the contact position of the pad is to be executed can be determined from, for example, times elapsed since the contact positions of the respective pads of the four wheels have been updated. For example, the detection of the contact position may be started from the wheel for which a long time has elapsed since the update. The detection of the contact position of the pad may be executed in one wheel or two wheels diagonal from each other.

When the determination in Step S10 is "YES" and the process proceeds to Step S11, a brake command for the case in which a brake command by the driver has been output is calculated. That is, in Step S11, a brake command for, for example, releasing the brake of any one of the wheels and then detecting the contact position of the pad of the one of the wheels (a brake command for pad contact position detection) is calculated. This brake command (brake command for pad contact position detection) can be output as, for example, the motor angle command C from host control to the position controller 43.

When the determination in Step S10 is "NO" and the process proceeds to Step S12, on the other hand, a brake command for the case in which a brake command by the driver has not been output is calculated. That is, in Step S12, a brake command for detecting the contact position of the pad of one of the wheels (a brake command for pad contact position detection) is calculated. This brake command (brake command for pad contact position detection) can also be output as, for example, the motor angle command C from host control to the position controller 43. It is only required that the brake commands for pad contact position detection of Step S1 and Step S12 be brake commands that increase monotonously within a range in which execution of highly accurate detection is determined to be permitted in Step S4. Detailed descriptions thereof are accordingly omitted.

Figure 4:
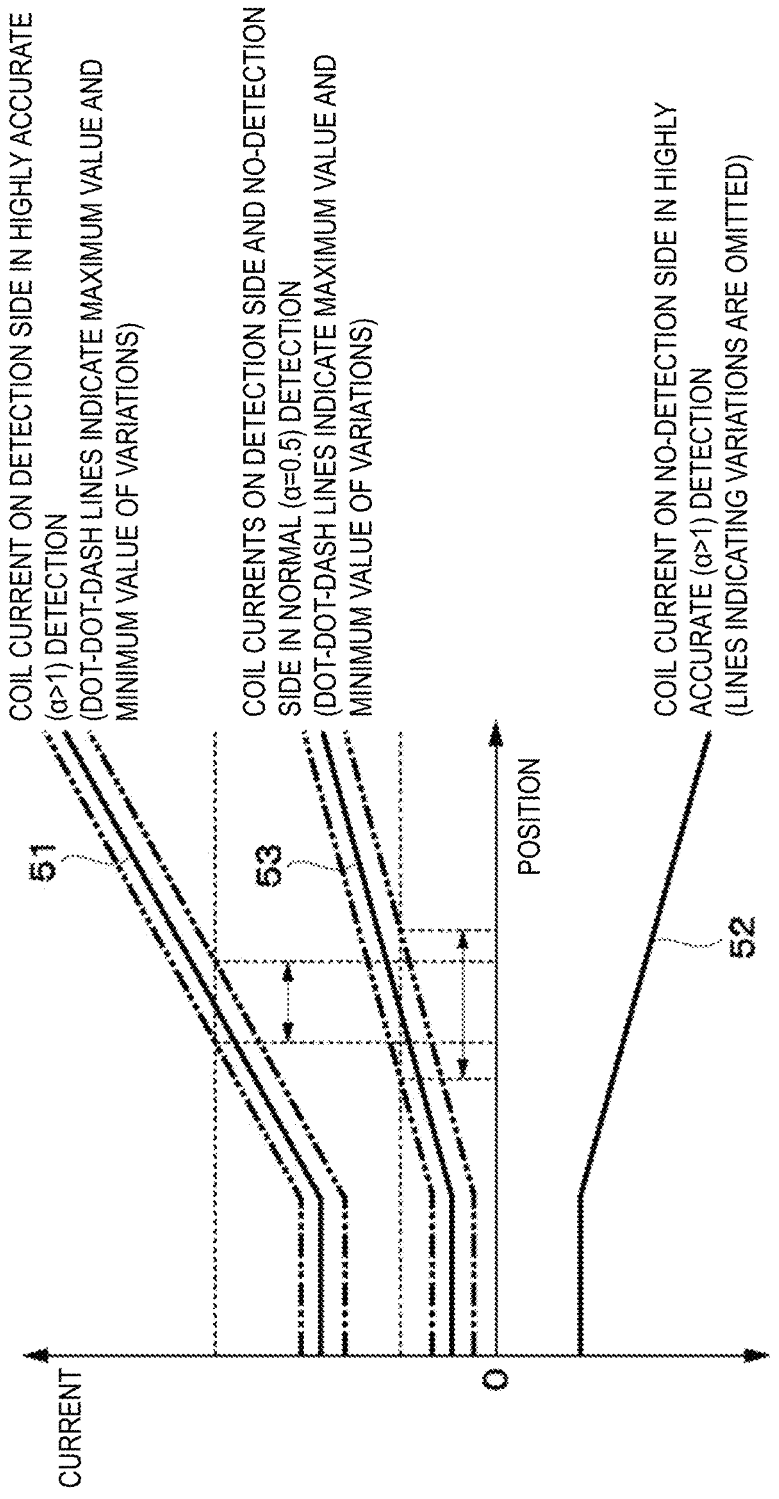
FIG. 4 is a characteristic line chart for illustrating a relationship between a current and a position of the brake pad (the contact member, the braking member) that is observed when braking is executed.

FIG. 4 is an illustration of a relationship between a current and a piston position in the operation of contact position detection in the processing steps of Step S7, Step S8, and Step S9. That is, FIG. 4 is an illustration of characteristics of currents in relation to piston positions of the detection-side coils and the no-detection-side coils in the operation of highly accurate (α>1) contact position detection, and characteristics of currents in relation to piston positions of the detection-side coils and the no-detection-side coils in the operation of normal (α=0.5) contact position detection. The piston position corresponds to the position of the brake pad.

In the operation of highly accurate (α>1) contact position detection, the detection-side coils are energized with a current in an amount greater than a brake command value. The no-detection-side coils are also energized with an amount of current that generates torque in a direction reverse to the operation direction so that a sum of the amount of energization of the detection-side coils and the amount of energization of the no-detection-side coils equals the brake command value. In FIG. 4, current-position characteristics (waveforms) in this case are illustrated, and a characteristic line 51 of FIG. 4 corresponds to a current characteristic (waveform) of the detection-side coils, and a characteristic line 52 of FIG. 4 corresponds to a current characteristic (waveform) of the no-detection-side coils.

In the operation of normal (α=0.5) contact position detection, the detection-side coils and the no-detection-side coils are each energized with an amount of current that is half the brake command value. A characteristic line 53 of FIG. 4 corresponds to a current characteristic (waveform) of the detection-side coils in this case. As is clear from FIG. 4, in the operation of highly accurate (α>1) contact position detection, the current change amount can be increased from the current change amount in the operation of normal (α=0.5) contact position detection, and the ratio of the current error to the energization amount can consequently be kept low. That is, the estimation error in estimation of the piston position (the contact position of the pad) can be made small.

Thus, the motor control system 1 in the embodiment includes the brake motor 2 serving as an electric motor and a motor control device 7 serving as a motor controller for controlling the brake motor 2. In the embodiment, the motor control device 7 corresponds to a control device for an electric brake. The electric brake includes, for example, an electric caliper (electric mechanism), which presses a brake pad (braking member) against a disc rotor (braked member), and the brake motor 2, which drives the electric caliper. The disc rotor corresponds to a contacted member, and the brake pad corresponds to a contact member that operates under control of the motor control device 7.

The motor control device 7 of the embodiment controls the brake motor 2 of the electric brake for applying a braking force to a vehicle. However, the motor control device is not limited thereto, and may be configured so as to control, for example, a steering motor of electric steering for steering the vehicle. In this case, the motor control device corresponds to a control device for electric steering.

The motor control device 7 includes the first motor drive unit 8, the second motor drive unit 10, and the first control unit 9 and/or the second control unit 11 serving as a control unit (control units). The first motor drive unit 8 is connected to the first winding set 5, which is the first-system coils of the brake motor 2. The second motor drive unit 10 is connected to the second winding set 6, which is the second-system coils of the brake motor 2.

The control units 9, 11 (the first control unit 9 and/or the second control unit 11) control the first motor drive unit 8 and the second motor drive unit 10. In this case, the control units 9, 11 control the electric brake via the brake motor 2. When the determination in Step S4 of FIG. 3 is "YES," the control units 9, 11 output the following to the first motor drive unit 8 and the second motor drive unit 10.

That is, the control unit 9, 11 outputs, to the first motor drive unit 8, a first current command for energizing the first winding set 5 so that the first torque, which is greater than torque generated in the brake motor 2 by the torque command for generating requested torque requested of the brake motor 2, and which is in the same direction as the direction of the requested torque, is generated. That is, when the requested torque is the torque command T* and the first current command is the current commands id1* and iq1*, the current commands id1* and iq1* are calculated by multiplying the torque command T* by "1/K×α." In this case, a is set so as to satisfy "α>1" in the processing step of Step S5 of FIG. 3. The control unit 9, 11 can accordingly output the current commands id1* and iq1* for generating the first torque (torque that is in the same direction as the direction of the torque command T* and that is greater than the torque command T*) to the first motor drive unit 8.

The control unit 9, 11 also outputs, to the second motor drive unit 10, a second current command for energizing the second winding set 6 so that the second torque, which is based on a difference between the requested torque and the first torque, and which is in a direction reverse to the direction of the first torque, is generated. That is, when the requested torque is the torque command T* and the second current command is the current commands id2* and iq2*, the current commands id2* and iq2* are calculated by multiplying the torque command T* by "−1/K×(α−1)." In this case, a is set so as to satisfy "α>1" in the processing step of Step S5 of FIG. 3. The control unit 9, 11 can accordingly output the current commands id2* and iq2* for generating the second torque (torque that is in a direction reverse to the direction of the torque command T* and that is based on a difference between the torque command T* and the first torque) to the second motor drive unit 10.

In the embodiment, the control unit 9, 11 detects a contact position at which the brake pad (the braking member, the contact member) comes into contact with the disc rotor (the braked member, the contacted member) based on a change in current caused to flow into the first winding set 5 by the first current command. That is, the control unit 9, 11 executes position detection (detection of the contact position) based on a current change amount (di/dx) of the first winding set 5 on the detection side, more specifically, based on comparison between the current change amount (di/dx) and a threshold value, in the processing step of Step S8 of FIG. 3.

In the embodiment, the torque based on the difference between the requested torque and the first torque is a differential between the requested torque and the first torque. That is, when the requested torque is the torque command T* and the first torque is "α×T*." the torque based on the difference between the requested torque and the first torque is "(α−1)×T*," that is, "α×T*−T*," which is the differential between the requested torque "T*" and the first torque "α×T*."

The control unit 9, 11 updates a physical quantity regarding the contact position of the brake pad w % ben the change amount of the contact position in relation to the current flowing in the first winding set 5 exceeds a predetermined threshold value. That is, when the current change amount (di/dx) of the first winding set 5 on the detection side exceeds a predetermined threshold value as a result of the processing step of Step S8 of FIG. 3, the control unit 9, 11 updates the contact position of the pad in the processing step of Step S9 of FIG. 3. The predetermined threshold value can be obtained as, for example, a change amount (current change amount) at the time when the brake pad and the disc rotor come into contact with each other, by calculation, an experiment, simulation, or the like, in advance.

In the embodiment, the control units 9, 11 output the first current command and the second current command when a predetermined restriction is not placed on a current usable by the electric brake and the response of the electric brake exceeds a predetermined value. That is, the control units 9, 11 output the first current command and the second current command, that is, the current commands id1*, iq1*, id2*, and iq2* with a set so as to satisfy "α>1," when the determination in Step S4 of FIG. 3 is "YES." In Step S4 of FIG. 3, the determination is "YES" when a predetermined restriction is not placed on a current supplied to the brake motor 2, and the response of the electric brake exceeds a predetermined value.

The restriction (predetermined restriction) on the current can be set so that a supply of currents to the first winding set 5 and the second winding set 6 is secured despite output of the command for generating the first torque to the first motor drive unit 8 and output of the command for generating the second torque to the second motor drive unit 10. The restriction on the response (a predetermined value of the response) can be set so that the response of the electric brake is secured despite generation of torque in a direction reverse to the direction of the requested torque in the second winding set 6.

In the embodiment, a magnitude of the first torque is set based on the clearance set due to the drag torque and on the detection error in contact position detection. The drag torque is a rotational resistance (torque) generated by contact between the brake pad and the disc rotor under a state in which the electric brake is not in operation. The clearance is a gap between the brake pad and the disc rotor.

That is, the control unit 9, 11 sets a as a value larger than 1 (α>1) in the processing step of Step S5 of FIG. 3. The value of a can be set based on the "clearance" and the "detection error in contact position detection" as described above.

In the embodiment, when a predetermined condition is established, the control units 9, 11 output the first current command to the second motor drive unit 10 and outputs the second current command to the first motor drive unit 8. That is, the control units 9, 11 set the detection-side system in the processing step of Step S6 of FIG. 3. At this point, the control units 9, 11 can switch (alternate) the systems between the detection side and the no-detection side based on the number of times of brake action, the trip, the time, the number of times of braking, or the like. A condition for switching (a predetermined condition) can be, for example, one brake action, one trip, a predetermined length of time, or a predetermined number of times of braking.

As described above, according to the embodiment, the control units 9, 11 (the first control unit 9 and/or the second control unit 11) output, to the first motor drive unit 8, the first current command, that is, the current commands id1* and iq1* for generating the first torque (α×T*, α>1), which is in the same direction as the direction of the requested torque (T*) and which is greater than the requested torque. The control units 9, 11 also output, to the second motor drive unit 10, the second current command, that is, the current commands id2* and iq2* for generating the second torque (T*−α×T*, α>1), which is in a direction reverse to the direction of the requested torque (T*) and which is based on the difference between the requested torque and the first torque.

This enables an increase in change amount (di/dx) of the current (motor current) of the first winding set 5 in relation to a change in load (thrust of the brake pad) applied to the rotor 4 of the brake motor 2. That is, in a configuration that generates torque by energizing the first winding set 5 and the second winding set 6 of two systems for one rotor 4, the change amount (di/dx) of the current of the first winding set 5 in relation to a change in load on the rotor 4 can be made large. When the position is detected based on a change in current, the accuracy of this position detection can accordingly be prevented from dropping.

According to the embodiment, the control unit 9, 11 detects a contact position at which the brake pad (the braking member, the contact member) comes into contact with the disc rotor (the braked member, the contacted member) based on a change in current caused to flow in the first winding set 5 by the first current command (current commands id1* and iq1*). In this case, the change amount (di/dx) of the current of the first winding set 5 in relation to a change in load that results from a contact of the brake pad (the braking member, the contact member) to the disc rotor (the braked member, the contacted member) can be made large, and the accuracy of the contact position detection can accordingly be prevented from dropping.

With highly accurate detection of the contact position accomplished, an error is no longer required to be taken into account when setting a clearance for a contact of the piston to the brake pad and, ultimately, a clearance for a contact of the brake pad to the disc rotor. As a result, the clearances can be set small, and amounts by which the clearances are closed at the time of braking are reduced, thus decreasing operating sounds that much. Further, with the clearances set small, the response of the brake improves and the stop distance can be shortened.

According to the embodiment, the torque based on the difference between the requested torque and the first torque is "α×T*−T*," that is, a differential between the requested torque "T*" and the first torque "α×T*." Accordingly, the control units 9, 11 can increase the change amount (di/dx) of the current of the first winding set 5 in relation to a change in load on the rotor 4 and generate the requested torque "T*" in the brake motor 2 as well by outputting the first current command (the current commands id1* and iq1* with a set so as to satisfy "α>1") to the first motor drive unit 8 and outputting the second current command (the current commands id2* and iq2* with a set so as to satisfy "α>1") to the second motor drive unit 10. In addition, with the requested torque "T*" generated in the brake motor 2, generated thrust (the thrust of the brake pad) in execution of contact position detection can be decreased. That is, torque generated in the brake motor 2 is not required to be large for the purpose of detecting the contact position, and, accordingly, loads applied to the brake pad, the disc rotor, the electric caliper (electric mechanism), and the like can be suppressed.

According to the embodiment, when the change amount (di/dx) of the contact position in relation to the current flowing in the first winding set 5 exceeds a predetermined threshold value as a result of the processing step of Step S8 of FIG. 3, the control unit 9, 11 updates the physical quantity regarding the contact position of the brake pad in the processing step of Step S9 of FIG. 3. The physical quantity regarding the contact position of the brake pad can accordingly be detected at high accuracy by comparison with the threshold value. In addition, the accuracy of the contact position detection can be kept high by updating the highly accurate physical quantity.

According to the embodiment, when it is found out in the processing step of Step S4 of FIG. 3 that the predetermined restriction is not placed on the usable current, and that the response exceeds the predetermined value, the control units 9, II output the first current command (the current commands id1* and iq1* with a set so as to satisfy "α>1") and the second current command (the current commands id2* and iq2* with a set so as to satisfy "α>1"). This prevents output of the first current command (the current commands id1* and iq1* with a set so as to satisfy "α>1") and the second current command (the current commands id2* and iq2* with a set so as to satisfy "α>1") from lowering the braking force of the electric brake and the response of the electric brake when the contact position of the brake pad is to be detected.

According to the embodiment, the magnitude of the first torque (more specifically, a magnitude of a by which the torque command is multiplied in calculation of the first torque) is set based on the clearance set due to the drag torque and on the detection error in contact position detection. This secures a required accuracy. That is, the change amount of the current in relation to a change in load on the rotor 4 can be made large (more specifically, the ratio of the current error to the energization amount can be made small) within a required range, and the accuracy of the position detection can thus be secured.

According to the embodiment, when the predetermined condition is established, the control units 9, 11 output the first current command (the current commands id2* and iq2* equal to the current commands id1* and iq1* with a set so as to satisfy "α>1") to the second motor drive unit 10, and output the second current command (the current commands id1* and iq1* equal to the current commands id2* and iq2* with a set so as to satisfy "α>1") to the first motor drive unit 8. This enables an increase in change amount of the current of the second winding set 6 in relation to a change in load on the rotor 4 of the brake motor 2 when the predetermined condition is established. Accordingly, when position detection is executed based on a change in current, for example, the accuracy of the position detection can be prevented from dropping in both systems.

The description of the embodiment takes a case of a double system including the first control unit 9 (a secondary system) and the second control unit 11 (a primary system) as an example. However, the present invention is not limited thereto, and is applicable to, for example, a triple system, a quadruple system, and a multiple system above a double system. For example, when the contact position of the pad is to be detected in a configuration of a triple system, a current of the detection side may be caused to flow in the remaining two systems in a reverse direction so that desired torque is reached, or may be caused to flow in one of the remaining systems in the reverse direction so that desired torque is reached.

The description of the embodiment takes, as an example, a configuration in which the second control unit 11 monitors the first control unit 9, that is, a configuration in which the second control unit 11 uses the phase current monitoring circuit 35 to monitor phase currents of the first motor drive unit 8. In other words, the description of the embodiment takes a case in which a monitoring side is the second control unit 11 and a monitored side is the first control unit 9 as an example. However, the present invention is not limited thereto, and, for example, the second control unit may be the monitored side, with the first control unit serving as the monitoring side.

In any case, when the detection of the contact position is executed, the detection side may be the first system (the first motor drive unit 8 and the first winding set 5 which is the first-system coils), with the second system (the second motor drive unit 10 and the second winding set 6 which is the second-system coils) set to the no-detection side, or the detection side may be the second system (the second motor drive unit 10 and the second winding set 6 which is the second-system coils), with the first system (the first motor drive unit 8 and the first winding set 5 which is the first-system coils) set to the no-detection side. That is, the detection-side system and the no-detection side system may be the same all the time, or the systems may be switched between the detection side and the no-detection side.

The description of the embodiment takes, as an example, a case in which an electric motor driven by the first motor drive unit 8 and the second motor drive unit 10 is the brake motor 2, that is, the brake motor 2 that controls (drives) an electric brake which applies a braking force to a vehicle. However, the present invention is not limited thereto, and the electric motor driven by the first motor drive unit and the second motor drive unit may be, for example, a steering motor for controlling (driving) a steering actuator of a vehicle. In this case, the steering motor can be driven by the first motor drive unit connected to the first control unit and the second motor drive unit connected to the second control unit. That is, the detection of the contact position in the embodiment is applicable to a configuration in which a six-phase motor is used and a point of contact between mechanical members is detectable as an inflection point of motor torque, for example, an electric parking system and a steering system. The detection of the contact position in the embodiment is not limited to electric mechanisms mounted on a vehicle, and is applicable to various electric mechanisms driven by an electric motor.

The description of the embodiment takes, as an example, a case in which the integrated control device 33 (the integrated ECU, the central ECU) which determines vehicle motion control for moving a vehicle with respect to a target trajectory obtained from an automatic driving control device (automatic driving ECU) is included as a controller of the vehicle (a vehicle controller). However, the controller of the vehicle (vehicle controller) is not limited thereto, and may be, for example, a control device other than the integrated control device 33, such as a steering control device or a suspension control device. That is, the controller of the vehicle (vehicle controller) is not required to be a host control device. The controller of the vehicle (vehicle controller) can be various control devices (ECUs) mounted on the vehicle.

According to the embodiment described above, the control units output the first current command (a command for generating the first torque, which is in the same direction as the direction of the requested torque and which is torque greater than the requested torque) to the first motor drive unit, and output the second current command (a command for generating the second torque, which is in a direction reverse to the direction of the requested torque and which is torque based on a difference between the requested torque and the first torque) to the second motor drive unit. This enables an increase in change amount of the current of the first-system coil in relation to a change in load applied to the rotor of the electric motor. That is, in the configuration that generates torque by energizing the coils of two systems for one rotor, the change amount of the current of the first-system coil in relation to a change in load on the rotor can be made large. When the position is detected based on a change in current, the accuracy of this position detection can accordingly be prevented from dropping.

According to the embodiment, the control units detect a contact position at which the contact member (braking member) comes into contact with the contacted member (braked member) based on a change in current caused to flow in the first-system coil by the first current command. In this case, the change amount of the current of the first-system coil in relation to a change in load that results from a contact of the contact member (braking member) to the contacted member (braked member) can be made large, and the accuracy of the contact position detection can accordingly be prevented from dropping.

According to the embodiment, the torque based on the difference between the requested torque and the first torque is a difference between a magnitude of the requested torque and a magnitude of the first torque. Accordingly, the control units can increase the change amount of the current of the first-system coil in relation to a change in load on the rotor and generate the requested torque in the electric motor as well by outputting the first current command to the first motor drive unit and outputting the second current command to the second motor drive unit.

According to the embodiment, when the change amount of the contact position in relation to the current flowing in the first-system coil exceeds a predetermined threshold value, the control units update the physical quantity regarding the contact position of the braking member. The physical quantity regarding the contact position of the braking member can accordingly be detected at high accuracy by comparison with the threshold value. In addition, the accuracy of the contact position detection can be kept high by updating the highly accurate physical quantity.

According to the embodiment, when it is found out that the predetermined restriction is not placed on the current usable by the electric brake, and that the response of the electric brake exceeds the predetermined value, the control units output the first current command and the second current command. This prevents output of the first current command and the second current command from lowering the braking force of the electric brake and the response of the electric brake when the contact position of the braking member is to be detected.

According to the embodiment, the magnitude of the first torque is set based on the clearance set due to the drag torque and on the detection error in contact position detection. This secures a required accuracy. That is, the change amount of the current in relation to a change in load on the rotor can be made large (more specifically, the ratio of the current error to the energization amount can be made small) within a required range, and the accuracy of the position detection can thus be secured.

According to the embodiment, when the predetermined condition is established, the control units output the first current command to the second motor drive unit, and output the second current command to the first motor drive unit. This enables an increase in change amount of the current of the second-system coil in relation to a change in load on the rotor of the electric motor when the predetermined condition is established. Accordingly, when position detection is executed based on a change in current, for example, the accuracy of the position detection can be prevented from dropping in both systems.

Note that, the present invention is not limited to the embodiment described above, and includes further various modification examples. For example, in the embodiment described above, the configurations are described in detail in order to clearly describe the present invention, but the present invention is not necessarily limited to an embodiment that includes all the configurations that have been described. Further, a part of the configuration of a given embodiment can be replaced by the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2021-095801 filed on Jun. 8, 2021. All disclosed contents including Specification, Scope of Claims, Drawings, and Abstract of Japanese Patent Application No. 2021-095801 filed on Jun. 8, 2021 are incorporated herein by reference in their entirety.

REFERENCE SIGNS LIST

2; brake motor (electric motor), 5: first winding set (first-system coil, 6: second winding set (second-system coil), 7: motor control device (control device), 8: first motor drive unit, 9: first control unit (control unit), 10: second motor drive unit, 11: second control unit (control unit)

The invention claimed is:

1. A control device for an electric brake, the electric brake including:

an electric mechanism configured to press a braking member against a braked member; and an electric motor configured to drive the electric mechanism, the electric motor including coils of two systems, the control device comprising:

a first motor drive unit connected to a first-system coil of the coils of the electric motor;

a second motor drive unit connected to a second-system coil of the coils of the electric motor; and a control unit configured to control the first motor drive unit and the second motor drive unit, the control unit being further configured to:

output, to the first motor drive unit, a first current command for energizing the first-system coil so that a first torque, which is a torque greater than a torque generated in the electric motor by a torque command for generating a requested torque requested of the electric motor, and which is in the same direction as a direction of the requested torque, is generated; and output, to the second motor drive unit, a second current command for energizing the second-system coil so that a second torque, which is a torque based on a difference between the requested torque and the first torque, and which is in a direction reverse to the direction of the first torque, is generated.

2. The control device for an electric brake according to claim 1, wherein the control unit is configured to detect a contact position of the braking member with respect to the braked member, based on a current change of the first-system coil that is caused by the first current command.

3. The control device for an electric brake according to claim 2, wherein the second torque based on the difference between the requested torque and the first torque is a difference between a magnitude of the requested torque and a magnitude of the first torque.

4. The control device for an electric brake according to claim 3, wherein the control unit is configured to update a physical quantity regarding the contact position of the braking member, when a change amount of the contact position in relation to the current flowing in the first-system coil exceeds a predetermined threshold value.

5. The control device for an electric brake according to claim 2, wherein the control unit is configured to output the first current command and the second current command when no predetermined restriction is placed on a current usable by the electric brake, and a response of the electric brake exceeds a predetermined value.

6. The control device for an electric brake according to claim 2, wherein a magnitude of the first torque is set based on:

a clearance between the braking member and the braked member, the clearance being set due to a drag torque generated by a contact between the braking member and the braked member under a state in which the electric brake is not in operation; and a detection error in detection of the contact position.

7. The control device for an electric brake according to claim 1, wherein the control unit is configured to output the first current command to the second motor drive unit and output the second current command to the first motor drive unit when a predetermined condition is established.

8. A control method for an electric brake, the electric brake including:

an electric mechanism configured to press a braking member against a braked member; and an electric motor configured to drive the electric mechanism, the electric motor including coils of two systems, the control method comprising:

outputting, by a control unit configured to control a first motor drive unit connected to a first-system coil of the coils of the electric motor and a second motor drive unit connected to a second-system coil of the coils of the electric motor, to the first motor drive unit, a first current command for energizing the first-system coil so that a first torque, which is a torque greater than a torque generated in the electric motor by a torque command for generating a requested torque requested of the electric motor, and which is in the same direction as a direction of the requested torque, is generated; and outputting, by the control unit, to the second motor drive unit, a second current command for energizing the second-system coil so that a second torque, which is a torque based on a difference between the requested torque and the first torque, and which is in a direction reverse to the direction of the first torque, is generated.

9. The control method for an electric brake according to claim 8, further comprising detecting, by the control unit, a contact position of the braking member with respect to the braked member, based on a current change of the first-system coil that is caused by the first current command.

10. A motor control device, comprising:

a first motor drive unit connected to a first-system coil of an electric motor including coils of two systems;

a second motor drive unit connected to a second-system coil of the coils of the electric motor; and a control unit configured to control the first motor drive unit and the second motor drive unit, the control unit being further configured to:

output, to the first motor drive unit, a first current command for energizing the first-system coil so that a first torque, which is a torque greater than a torque generated in the electric motor by a torque command for generating a requested torque requested of the electric motor, and which is in the same direction as a direction of the requested torque, is generated; and output, to the second motor drive unit, a second current command for energizing the second-system coil so that a second torque, which is a torque based on a difference between the requested torque and the first torque, and which is in a direction reverse to the direction of the first torque, is generated.

11. The motor control device according to claim 10, wherein the control unit is configured to detect a contact position at which a contact member comes into contact with a contacted member, based on a current change of the first-system coil that is caused by the first current command, the contact member operating under control of the motor control device.

* * * * *